(12) United States Patent
Flynn et al.

(10) Patent No.: US 9,547,350 B2
(45) Date of Patent: Jan. 17, 2017

(54) NETWORK POWERED DEVICE

(75) Inventors: Thomas J Flynn, Magnolia, TX (US);
Robert C Brooks, Houston, TX (US);
Michael R Durham, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 342 days.

(21) Appl. No.: 14/352,820

(22) PCT Filed: Oct. 28, 2011

(86) PCT No.: PCT/US2011/058225
§ 371 (c)(1),
(2), (4) Date: Apr. 18, 2014

(87) PCT Pub. No.: WO2013/062567
PCT Pub. Date: May 2, 2013

(65) Prior Publication Data
US 2014/0250327 A1    Sep. 4, 2014

(51) Int. Cl.
*G06F 1/30* (2006.01)
*H02J 3/00* (2006.01)

(52) U.S. Cl.
CPC *G06F 1/30* (2013.01); *H02J 3/005* (2013.01)

(58) Field of Classification Search
CPC .................................. G06F 1/30; H02J 3/005
See application file for complete search history.

(56) References Cited

U.S. PATENT DOCUMENTS

| 2005/0125507 | A1 | 6/2005 | Atias et al. | |
|---|---|---|---|---|
| 2006/0177192 | A1* | 8/2006 | Jonnala | G06F 1/26 385/147 |
| 2006/0273661 | A1 | 12/2006 | Toebes et al. | |
| 2007/0041387 | A1 | 2/2007 | Ghoshal et al. | |
| 2007/0257780 | A1* | 11/2007 | Schindler | H04L 12/10 713/300 |
| 2008/0052546 | A1* | 2/2008 | Schindler | G06F 1/266 713/300 |
| 2008/0098240 | A1 | 4/2008 | Hussain et al. | |
| 2008/0162973 | A1 | 7/2008 | Landry et al. | |
| 2009/0217088 | A1 | 8/2009 | Diab | |

(Continued)

FOREIGN PATENT DOCUMENTS

| CN | 201294536 | 8/2009 |
|---|---|---|
| CN | 101710860 | 5/2010 |

(Continued)

OTHER PUBLICATIONS

Integrated High Power PoE-PD Interface & DC-DC Converter, Controllerhttp://www.onsemi.com/pub_link/Collateral/NCP1081%20DATA%20SHEET.PDF, Sep. 2008.

(Continued)

*Primary Examiner* — Stefan Stoynov
(74) *Attorney, Agent, or Firm* — HP Inc. Patent Department (57) ABSTRACT

Example embodiments disclosed herein relate to determining whether power is supplied at a power level to a network powered device. A network connector can be used to provide power and communications to the network powered device. The network powered device can represent itself to power sourcing equipment as a device using power at the power level. An indicator indicates whether power is supplied at the power level.

19 Claims, 4 Drawing Sheets

(56) References Cited

U.S. PATENT DOCUMENTS

2009/0235093 A1    9/2009  Diab

FOREIGN PATENT DOCUMENTS

| CN | 101826970 | 9/2010 |
| CN | 102113270 | 6/2011 |
| TW | 200810419 A | 2/2008 |
| TW | 201108665 A | 3/2011 |
| TW | 201108665 A1 | 3/2011 |

OTHER PUBLICATIONS

International Searching Authority Appl No. PCT/US2011/058225, Filed Oct. 28, 2011, International Search Report, 4 pp, Dated Jun. 22, 2012.
Single IEEE 802.3af Compliant PSE Controller with Internal Switch,http://cds.linear.com/docs/Datasheet/4263fe.pdf, retrieved Sep. 2011.

* cited by examiner

NETWORK POWERED DEVICE

BACKGROUND

Computing systems today are connected via various networks, for example wired networks such as Ethernet. As these networks have developed, devices have been developed that are capable of being powered via these network connections. The Institute of Electrical and Electronics Engineers (IEEE) has developed the IEEE 802.3af and 802.3at standards that define Power over Ethernet. Power over Ethernet systems involve delivering power from a Power Sourcing Equipment (PSE) to a Powered Device (PD) located at an opposite end of a network connection.

BRIEF DESCRIPTION OF THE DRAWINGS

The following detailed description references the drawings, wherein.

DETAILED DESCRIPTION

As detailed above, power can be provided from power sourcing equipment (PSE) to powered devices (PDs) via network connections. Increasingly, more and more types of devices are being developed to run as PDs powered by network connections. For example, powered devices, such as Internet Protocol (IP) cameras, IP card readers, IP phones, wireless access points, etc., are being added to networks and consuming power.

Powered devices are devices that are capable of being powered by power sourcing equipment. However, as more and more powered devices are connected to power sourcing equipment, such as network switches or hubs, power sourcing equipment providing power to its powered devices can become oversubscribed or otherwise unable to provide sufficient power to its powered devices. In certain embodiments, PSEs and PDs can conform to a standard or specification. In certain examples, a standard and/or specification is a set of rules that devices should and/or shall follow in a power over network system. In some embodiments, the PDs and/or PSEs follow a standard by the Institute of Electrical and Electronics Engineers (IEEE) such as the IEEE 802.3af and/or IEEE 802.3at standards providing specifications to implement Power over Ethernet (PoE). In other embodiments, the PSEs and PDs described herein may conform to another specification or approach.

Many of today's PDs are low powered devices and draw less power than is allowed by current specifications such as the IEEE standards. For example, IEEE 802.3af and 802.3at provide for classes of PDs. In the 802.3at specification, Class 0 provides for a power allocation of 13 W, Class 1 provides for a power allocation of 3.84 W, Class 2 provides for a power allocation of 6.49 W, Class 3 provides for a power allocation of 13 W, and Class 4 provides for a power allocation of 25.5 W. Classes 0-3 are available on 802.3af and 802.3at while Class 4 is available on 802.3at. In certain examples, the allocation values can be considered the maximum values of average power over a time range (e.g., 1 second). These examples relate to the power available at the PD. Due to power loss in the cable, the PSE may need to allocate additional power to be able to guarantee the corresponding amount of power to the PD. For example, the PSE may be required to be able to provide a minimum output level of 15.4 W for Class 0, 4 W for class 1, 7 W for class 2, and 15.4 W for class 3. In the case of other standards or specifications, for example, proprietary standards/specifications, other ranges and/or power levels can be used. As such, PDs can be classified in a group that can be allotted at least a certain amount of power from a PSE providing power.

Because many of the PDs are low powered (e.g., IP phones, IP card readers, etc.), PSEs often have more ports than the PSE's power supply can supply maximum power to simultaneously. For example, a PSE with 24 ports may be able to supply a maximum of 92.16 W of power to PDs after accounting for power losses over power cables. That would be enough power to allot each of the PDs with 3.84 W. If one or more of the PDs request additional power (e.g., 13 W), the corresponding port may provide additional power to that PD if the power supply allotments have not been consumed. However, the allotting of extra power to that port means that one or more of the other ports, which may be available or not used by PoE PDs, may not have enough power to supply a power level requested by a PD later connected. As such, there is no guarantee that someone attempting to plug in a PD into a PSE that the PSE would be able to provide the requested level of power. Further, because the PSE provides the power to the PD, the user may not understand whether the lack of powering up of the PD is because of a defective device or because of insufficient powering capabilities of the PSE. This can further be exacerbated if the user does not have access to the PSE, which may be able to provide additional information.

Accordingly, various embodiments disclosed herein relate to a network powered device that when plugged into a PSE can report to a user whether or not the PSE has a sufficient amount of power available to power the network powered device. An auxiliary power source can be used to provide the network powered device with power if the PSE does not have sufficient amount of power available to allocate to the network powered device. Further, the amount of power requested by the network powered device can be variable, for example, based on a switch or other selection mechanism. Moreover, if there is a failed power negotiation at a first power level requested, the network powered device may automatically attempt to negotiate for a second, reduced power level. This information may also be conveyed to a user of the network powered device. As such, the network powered device can be used as a test tool to allow an administrator of PDs to diagnose a problem.

Figure 1:
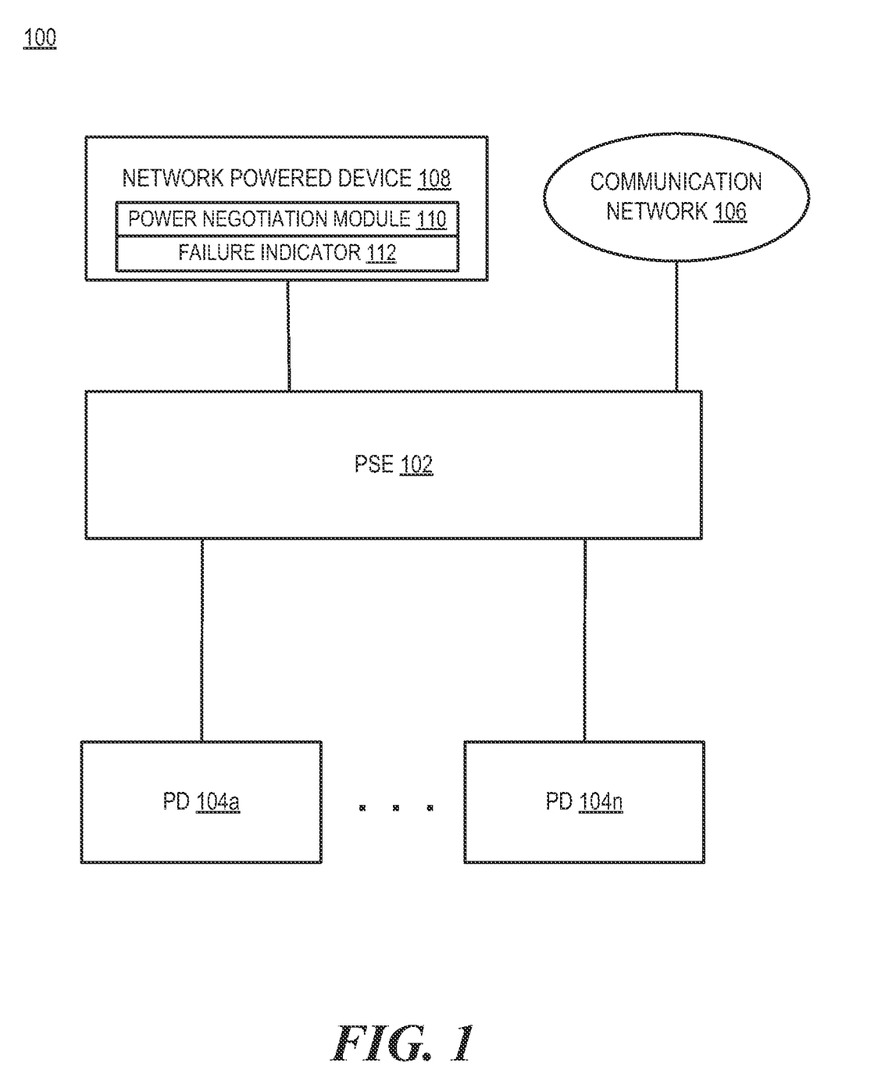
FIG. 1 is a block diagram of a system for powering devices via a network connection, according to one example.

FIG. 1 is a block diagram of a system for powering devices via a network connection, according to one example. The system 100 can include power sourcing equipment (PSE) 102 as well as powered devices (PDs) 104a-104n connected to the PSE 102. The PSE 102 can be used to connect the PDs 104 with other devices via a communication network 106. Further, a network powered device 108 with the capability to indicate whether requested power from the PSE 102 is available can be connected to the PSE 102. In certain scenarios, the PDs 104 can be connected to the communication network 106 via another connection. In certain examples, PSEs 102 are network devices (e.g., switches, midspans, etc.) that are capable of providing power over a network connection (e.g., according to a PoE standard proprietary system, etc.). Further, in some examples, PDs 104*a*-104*n* and the network powered device 108 are devices capable of being powered by a network connection (e.g., via power sourcing equipment such as PSE 102). PDs 104 and the network powered device 108 can be considered network powered devices that can receive power via at least one network connection (e.g., via the PSE 102). As noted, the power reception can be based on a standard or specification, such as a PoE standard or proprietary specification.

In certain examples, PDs 104*a*-104*n* are computing devices, such as network storage devices, servers, client computers, laptop computers, desktop computers, mobile computers, tablets, pad devices, terminals, other computing devices that can be powered via a network connection, etc. In other embodiments, the PDs 104*a*-104*n* can include special purpose machines such as media players, routing devices, communication devices such as IP telephones, etc. The PSE 102 and the PDs 104 can be implemented via a processing element, memory, and/or other components. For example, one of the PDs 104 can be an all-in-one thin client or an IP telephone.

The communication network 106 can use wired communications, wireless communications, or combinations thereof. Further, the communication network 106 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network 106 can be in the form of a direct network link between devices. Various communications structures and infrastructure can be utilized to implement the communication network(s). In certain examples, a direct link is used to connect the PDs 104 and/or the network powered device 108 to the PSE 102. Other sets of PSEs and PDs as well as other devices can be communicated with via the communication network 106.

By way of example, the PSE 102 and PDs 104, and network powered device 108 can communicate with each other and/or other components with access to the communication network 106 via a communication protocol or multiple protocols. A protocol can be a set of rules that defines how nodes of the communication network 106 interact with other nodes. Further, communications between network nodes can be implemented by exchanging discrete packets of data or sending messages. Packets can include header information associated with a protocol (e.g., information on the location of the network node(s) to contact) as well as payload information. A program or application executing on the PSE 102, the PDs 104, the network powered device, or a combination thereof can utilize one or more layers of communication to utilize the messages. In certain scenarios, an Ethernet cable (e.g., a Category (CAT) 3 cable, a CAT 5 cable, etc.) can be used to connect the PSE 102 to the PDs 104, network powered device 108, and/or other network elements. The Ethernet cable can carry both power and communications. Different cables can have different resistances and/or lengths. As such, using one cable instead of another can change the amount of power available at a PDs 104. Also, because of this, power delivered to a PD 104 may be different than the power allotted to the PD 104. For example, a Class 3 PD can expect 13 W of power from the PSE 102, but the PSE 102 may need to allocate a greater amount of power, for example, 15.4 W of power to the PD 104.

As PDs 104 connect to the PSE 102, the PSE 102 negotiates with and allocates an amount of power for that PD 104. The PSE 102 can search for PoE enabled PDs using a detection mechanism. For example, the PSE 102 can apply a voltage ramp to a PD 104 and look for a characteristic impedance from a load. In certain scenarios, the load can be within a particular range, for example, a 25 kΩ load. The PD 104 can provide the load. If the impedance is not detected, the PSE 102 can assume that a connected device is not a compatible powered device and does not provide power to the connected device. As such, the connection can be operated as a standard Ethernet connection. If the impedance is detected, the PSE 102 can move to a classification phase. In one example, the detection phase voltage ramp for IEEE 802.3 devices is between 2.5V and 10V.

The classification phase can occur during further ramp up of voltage to the PD 104. In one example, the voltage ramp for IEEE 802.3 devices is between 15V and 20V. During this voltage transition, the PD 104 draws a specified current to identify its device class. A default class, such as Class 0 of the IEEE 802.3 specifications can include a draw between 0 mA and 4 mA, while Class 1 draws between 9 mA and 12 mA, Class 2 draws between 17 mA and 20 mA. Class 3 draws between 26 mA and 30 mA, and Class 4 draws between 36 mA and 44 mA. Other Classes and/or other negotiation approaches can be used. A standard and/or specification can be used to specify what the PD 104 needs to do to represent that it would like to allocate a certain amount of power from the PSE 102. Both devices can operate on the standard and/or specification.

The PSE 102 can determine whether it is capable of providing the requested power. If the PSE 102 is incapable of providing the requested level of power, the PSE 102 can remove power from the PD 104. If the PSE 102 is capable of providing the requested level of power, the PSE 102 can allocate that amount of power for the PD 104. Then power, at the negotiated power level, can be provided by the PSE 102 to the PD 104. As more and more PDs 104*a*-104*n* are attached to the PSE 102, the total available PoE power of the PSE 102 may be reduced. As such, when another powered device, for example, the network powered device 108 requests power, the PSE 102 may be unable to fulfill the request at the requested power level.

The network powered device 108 can be connected to the PSE 102 via an Ethernet connection. In certain examples, the network powered device 108 can be a handheld test tool that can be easily moved to check power information at different connections to one or more PSEs. In other examples, parts of the network powered device 108 may be embedded in a PD primarily used for another purpose. As noted above, the network powered device 108 can be a powered device that is able to indicate whether a negotiation for power has been successful and/or has failed. A power negotiation module 110 can be used negotiate for the power. Further, a failure indicator 112 can be used to indicate if a negotiation for power has failed. Moreover, the network powered device 108 can include an auxiliary power supply, such as a battery and/or an external power source. The auxiliary power supply can be used to provide power to the network powered device 108 if the negotiation with the PSE 102 for power at a particular power level fails. Further, the network powered device 108 can provide information as to what power level may be available as further detailed in FIGS. 2A and 2B. As such, the network powered device 108 can be used to inform a user of power availability of the PSE 102. In certain scenarios, the PSE 102 can be located at a remote location from the port that the user is connecting the network powered device 108 to.

Figure 2A:
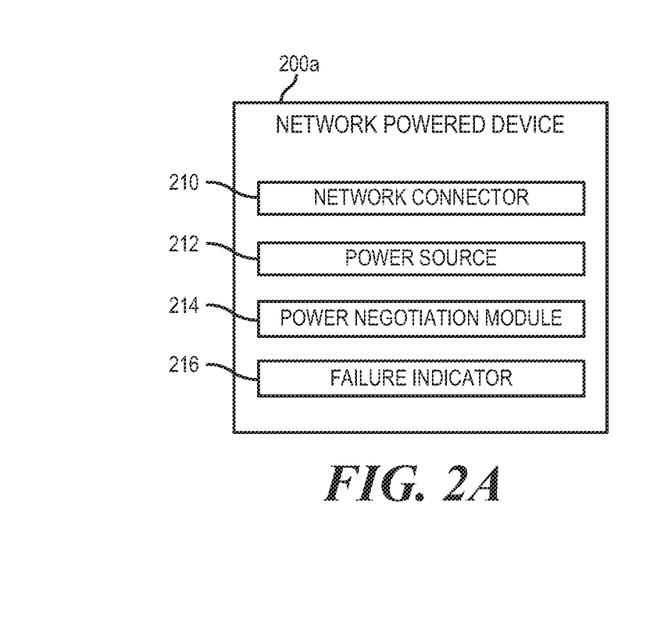
FIGS. 2A and 2B are block diagrams of network powered devices that are capable of indicating power information, according to various examples.
Figure 2B:
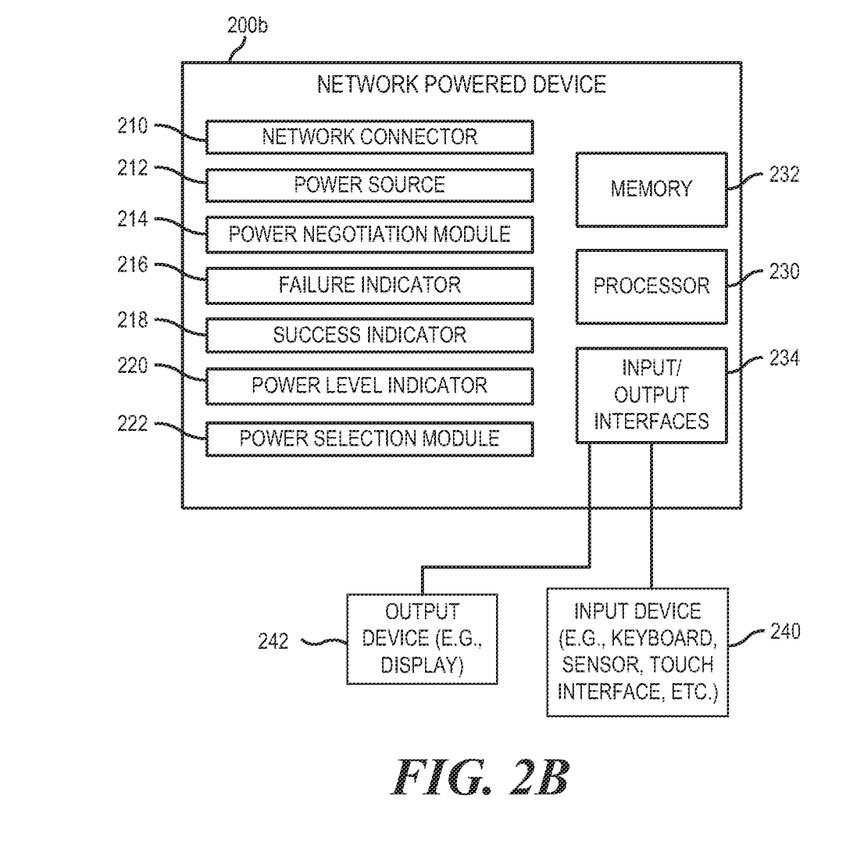

FIGS. 2A and 2B are block diagrams of network powered devices that are capable of indicating power information, according to various examples. Network powered devices 200a, 200b include components that can be utilized to determine whether a port connected to a PSE lacks available requested power. The respective network powered devices 200a, 200b may be a computing device or any other PD. Further, the network powered devices 200a, 200b can be implemented as a tool for the purpose of determining whether the PSE 102 will provide a requested amount of power to the respective network powered devices 200a, 200b.

The network powered device 200 can include a physical network connector 210 that can provide power and communications to the network powered device 200. The network connector 210 can provide, via a connection to a PSE or other network element, the network powered device 200 with communication information from outside of the network powered device 200. Further, the network connector 210 can provide the network powered device 200 with power from a PSE. As noted, this can be implemented using one or more standards or specifications, for example, PoE standards.

The network powered device 200 can also include a power source 212. The power source 212 can be a power supply other than a power over network connection power. Further, the power source 212 can be an auxiliary power source. As such, in certain scenarios, the power source 212 can be used to supplement the network connection power. For example, in certain scenarios, the network connection power would be the primary supply used and if it is unable to power the network powered device 200, the power source 212 can be used. In some embodiments, the power source 212 can be a battery or multiple batteries, a wall plug in unit (e.g., via an AC adapter), or the like.

A power negotiation module 214 can be used to negotiate for power from a PSE connected via the network connector 210. In certain examples, the power negotiation module 214 can be implemented via circuitry. Circuitry can include one or more transistors, resistors, capacitors, diodes, or combinations thereof to implement. Further, logic can be used in conjunction with the circuitry to implement the power negotiation module 214.

In one example, the network powered device 200 presents itself to a PSE using a 25 kΩ load at a first voltage ramp up range (e.g., between 2.5V and 10V) to indicate that the network powered device 200 is compatible. The ramp up range can be controlled by the PSE. Then, at a second ramp up range, for example, between 15V and 20V, the power negotiation module 214 can present the network powered device 200 as another bad. The other load can be used to classify the network powered device 200 by the PSE. An under voltage lockout circuit or multiple under voltage lockout circuits can be used to control what is presented to the PSE at different voltage levels. In certain examples, under voltage lockout circuits and a pass-switch can be used to enable PoE circuitry during the ramp up period and then other system functionality if the PSE provides additional power (e.g., if the PSE applies a voltage over 30V). In certain embodiments, a switch or other selection mechanism may be used to change the power classification the network powered device 200 wishes to represent itself as. In other examples, other negotiation methods can be used. For example, the power source 212 can be used to provide power to a microcontroller or other circuitry that can control what the network powered device 200 presents itself as.

If the request for power fails, a failure indicator 216 can be used to present that the negotiation has failed. In certain examples, a light emitting diode (LED), a display, audio (e.g., via a speaker), a message via the network connection, or other communication methods can be used to provide the indications. In some scenarios, the failure indicator can be powered by the power source 212 if the negotiation has failed. In certain examples, an LED or other information can be presented with a combination of the LED being lit and reference information (e.g., markings on the network powered device, a manual, etc.).

Further, the network powered device 200 can include a success indicator 218 to indicate whether the negotiation was successful. Further, a power level indicator 220 can be used to indicate a power level for negotiation by the network powered device 200. Similar components to the failure indicator 216 can be used to implement the success indicator 218 and/or power level indicator 220.

In one example, the negotiation can be associated with a request for power at a first power level. In certain embodiments, a request for a power level is a request for at least a certain amount of power to be reserved for the network powered device 200 by the PSE. In an 802.3 compatible device, this can be performed by identifying the network powered device 200 at a particular class. If the negotiation for the first power level fails, a power selection module 222 can be used to change the power level. As such, a second negotiation can be performed requesting a second power level. In certain examples, the second power level is less than the first power level. Similarly, if the second negotiation fails, further requests for lesser power levels can be made. In certain examples, one of the power levels is successful; the success indicator 218 can be used. Further, the power level indicator 220 can be used to indicate the successful power level. As noted, this may be indicated via an LED, a display, audio, or other devices. In one example, the determination of whether the negotiation failed can be based on whether the network powered device 200 receives power from the PSE above a certain level (e.g., 30 V, 35 V, etc.). If the PSE and the network powered device 200 both conform to the same standard, the representation made by the network powered device 200 and the continued ramping of voltage by the PSE can lead to the conclusion that the negotiation was successful.

In certain embodiments, the power selection module 222 can be used to select a power level associated with the negotiation for power. For example, the power selection module 222 can be used to set the network powered device 200 to mimic a PD associated with a particular class. The power selection module 222 can be set based on user input, for example, via a switch or other communication.

A processor 230, such as a central processing unit (CPU) or a microprocessor suitable for retrieval and execution of instructions and/or electronic circuits can be configured to perform some or all of the functionality of any of the modules 214-222 described herein. In certain scenarios, instructions and/or other information, such as power status information, can be included in memory 232 or other memory. Input/output interfaces 234 may additionally be provided by the network powered device 200*b*. For example, input devices 240, such as a keyboard, a sensor, a touch interface, a mouse, a switch, a microphone, etc. can be utilized to receive input from an environment surrounding the network powered device 200*b*. Further, an output device 242, such as a display or LED, can be utilized to present information to users. Examples of output devices include speakers, display devices, amplifiers, etc. Moreover, in certain embodiments, some components can be utilized to implement functionality of other components described herein.

Each of the modules 214-222 may include, for example, hardware devices including electronic circuitry for implementing the functionality described herein. In addition or as an alternative, some of the modules 214-222 may be implemented as a series of instructions encoded on a machine-readable storage medium of network powered device 200 and executable by processor 230. It should be noted that, in some embodiments, some modules are implemented as hardware devices, while other modules are implemented as executable instructions.

In one example, the negotiation for power between the network powered device 200 and a PSE includes providing a first current draw on a connection via the network connector 210. The current draw can be used to indicate the request for the first power level. As noted, the power level requested can be based on a power classification the network powered device 200 is representing itself as. If the negotiation fails, the memory 232 can store an indicator of the failed negotiation. Because of the power source 212, the memory 232, and/or processor 230 can still have power to determine another course of action because power is unavailable from the PSE. As such, for the next iteration of the PSE looking at the network powered device 200, the power selection module 222 can automatically be used to change the power level requested to a second power level. A second current draw can be placed on the connection to the PSE indicating the request for the second power level. The second power level can be based on the indicator stored in the memory 232. In certain scenarios, the current draw can be selected by a processor 230 by enabling a switch (e.g., a transistor based switch) enabling a resistor of the correct resistance. Further, the process can continue if the request for the second power level is unsuccessful.

Figure 3:
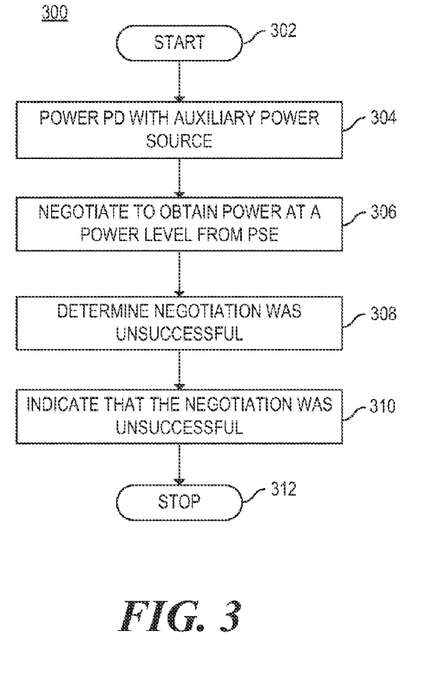
FIG. 3 is a flowchart of a method for indicating whether a negotiation with a power sourcing equipment was unsuccessful, according to one example.

FIG. 3 is a flowchart of a method for indicating whether a negotiation with a power sourcing equipment was unsuccessful, according to one example. Although execution of method 300 is described below with reference to network powered device 200, other suitable components for execution of method 300 can be utilized (e.g., computing device 500). Method 300 may be implemented in the form of executable instructions stored on a machine-readable storage medium and/or in the form of electronic circuitry.

Method 300 may start at 302 and proceed to 304, where a network powered device 200 is powered using an auxiliary power source. In certain examples, the network powered device 200 can include a network connector 210 that can connect the network powered device to a PSE. The connection can provide power and/or communications when connected to the PSE. In one example, the connection can be an Ethernet connection. Further, in certain embodiments, an auxiliary power source is a power source that is an alternative to the power over network connection for the network powered device 200.

Then, at 306, the network powered device 200 can negotiate to obtain power at a particular power level from the PSE. The power level can be set, for example, by using a switch. The switch can be used to change electrical connections used for negotiation. Further, the negotiation can be based on a representation made by the network powered device to the PSE based on the set power level. As noted previously, the power level can be associated with a classification and/or be used to determine how much power is reserved at the PSE for the network powered device. Moreover, as detailed above, the representation made can be based on one or more loads presented to the PSE.

Then, at 308, the network powered device can determine that the negotiation to obtain power at the power level from the PSE was unsuccessful. The determination can be based on whether the PSE provides power, via the network connector, to the network powered device above a threshold voltage level. In one example, a voltage meter can be used to determine the amount of voltage received from the PSE. In another example, an under-voltage lockout circuit can be used to keep voltage from the PSE from going to a circuit. If voltage is found at the circuit, it can be determined that the negotiation was successful. In other examples, it can be determined that the negotiation was unsuccessful if the voltage does not meet the threshold, if no voltage goes to the circuit, if no power is provided by the PSE after a certain amount of time, and/or combinations thereof. Various approaches can be used to determine whether voltage above a certain threshold is provided by the PSE.

Then, at 310, the network powered device can indicate that the negotiation was unsuccessful via an indicator disposed upon the network powered device. As noted above, the indicator can include one or more LEDs, a display, or the like. Further, the indication that a different request for a lower power level was successful as further described in method 400 can be an indication that the current request is unsuccessful. In certain scenarios, circuitry can drive the display. As such, the indicator can include a power level requested and whether the negotiation was successful, as well as other information. The method 300 can proceed to 312, where the method 300 stops. The network powered device can continue to perform other functionality. For example, the network powered device can perform method 400.

Figure 4:
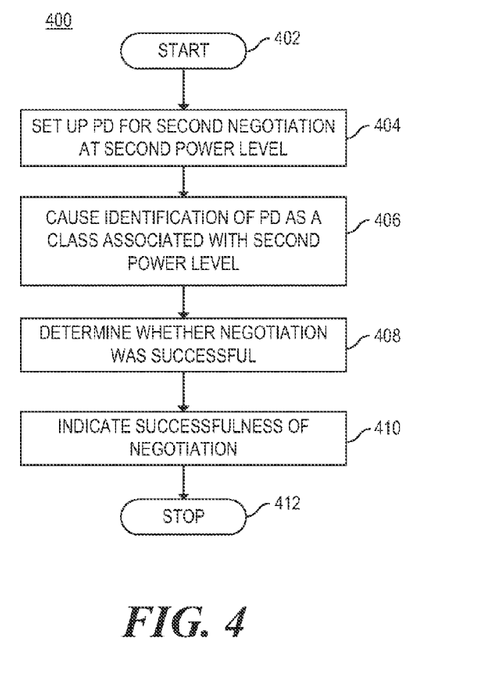
FIG. 4 is a flowchart of a method for indicating whether a second negotiation for power with a power sourcing equipment was successful, according to one example.

FIG. 4 is a flowchart of a method for indicating whether a second negotiation for power with a power sourcing equipment was successful, according to one example. Although execution of method 400 is described below with reference to network powered device 200, other suitable components for execution of method 400 can be utilized (e.g., computing device 500). Method 400 may be implemented in the form of executable instructions stored on a machine-readable storage medium and/or in the form of electronic circuitry.

The method 400 can start at 402, where the network powered device 200 can be in a state where the network powered device 200 can determine that a request for power from a PSE is unsuccessful at negotiating for a first power level. The method 400 can continue to 404, where a power selection module 222 of the network powered device 200 can set up the network powered device for a second negotiation with the PSE to obtain power at a second power level. Further, the second power level can be selected by a user (e.g., via a switch or use of other input) or automatically selected via the power selection module 222 and/or processor 230. Moreover, the second power level can be lower than the first power level. If there is insufficient power capacity by the PSE to provide adequate power at the first power level, there may be sufficient undistributed power capacity to provide at the second power level.

Then, at 406, the power negotiation module 214 can cause identification of the network powered device 200 to the PSE as a class associated with the second power level. In this embodiment, both the PSE and the network powered device 200 can coordinate to a specification or standard. The standard and/or specification can identify classes of PDs that the network powered device 200 can represent itself as.

At 408, the power negotiation module 214 can determine whether the negotiation was successful. The determination can be based on whether the network powered device 200 receives power at a voltage above a threshold level. Other approaches to the determination as detailed above can also be performed. In certain embodiments, if the second negotiation was unsuccessful, the additional iterations of renegotiations with requests for power at lower power levels can be performed in a manner similar to method 400.

At 410, the network powered device 200 can indicate the successfulness of the second negotiation. If the second negotiation was unsuccessful, a failure indicator 216 can be presented. If the second negotiation was successful, a success indicator 218 can be presented. Further, a power level indicator 220 can be used to provide information about the power level associated with the second negotiation. Then, the method 400 can proceed to 412, where the method 400 stops. The network powered device 200 can continue to perform other tasks, such as executing instructions via the processor 230.

Figure 5:
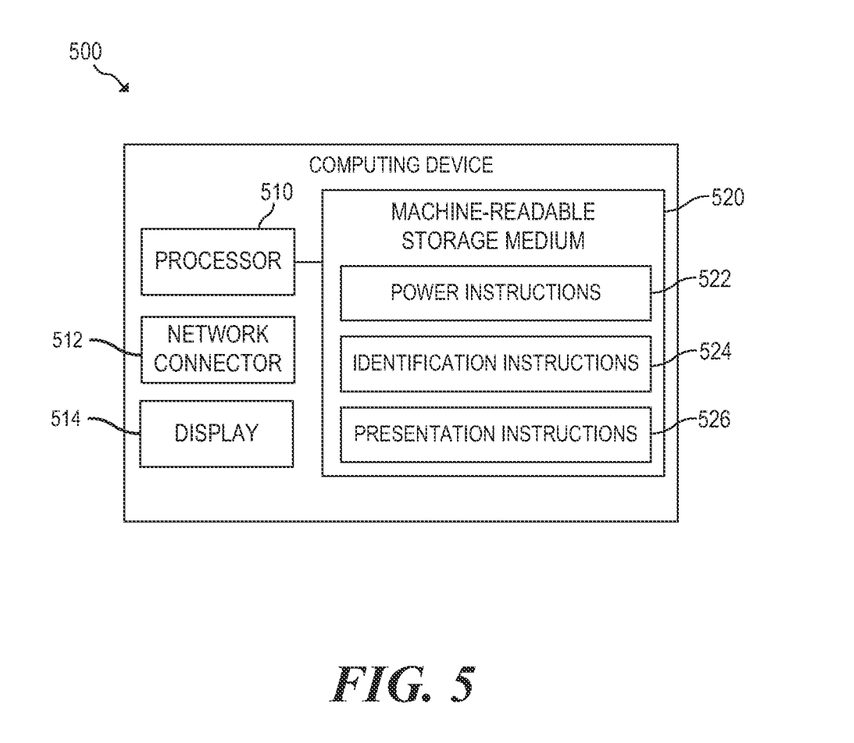
FIG. 5 is a block diagram of a computing device for presenting whether a request for power from a power sourcing equipment was successful, according to one example.

FIG. 5 is a block diagram of a computing device for presenting whether a request for power from a power sourcing equipment was successful, according to one example. The computing device 500 includes, for example, a processor 510, a network connector 512, a display 514, and a machine-readable storage medium 520 including instructions 522, 524, 526 for presenting the successfulness of a request for power from a PSE. Computing device 500 may be, for example, a group of components that can be used to implement a network powered device. Further, parts of the computing device 500 can be used in a network powered device.

Processor 510 may be, at least one central processing unit (CPU), at least one semiconductor-based microprocessor, at least one graphics processing unit (GPU), other hardware devices suitable for retrieval and execution of instructions stored in machine-readable storage medium 520, or combinations thereof. For example, the processor 510 may include multiple cores on a chip, include multiple cores across multiple chips, or combinations thereof. Processor 510 may fetch, decode, and execute instructions 522, 524, 526 to implement methods 300 and 400. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for determining whether a request for power was successful.

Power instructions 522 can be executed by the processor 510 to determine a power classification to request power via a network connector 512 from a PSE. The power classification can be associated with a standard and/or specification that the PSE can be associated with. As such, representations made by the computing device 500 via the network connector 512 can be deciphered by the PSE. The selection of the power classification can be based on input from a user (e.g., using a switch, a keyboard, etc.) Further, the selection of the power classification can be based on a default or set power up characteristic. For example, the computing device can be set to cause a specific set of representations to the PSE, for example, as mentioned in methods 300 and 400. In certain scenarios, because power is being requested from the PSE, the processor 510 and other components of the computing device 500 may be powered by another power source, such as an auxiliary power source. A circuit can be included to switch from the auxiliary power source to power from the network connector 512 if a certain threshold of voltage is received via the network connector 512.

The identification instructions 524 can be used to cause the computing device to be presented as a network powered device to the PSE. The presentation can be via the network connector 512 and a connection (e.g., an Ethernet connection) to the PSE. The identification can conform to a standard or specification that the PSE also follows. Further, the identification can be used to request power at a particular power level associated with the power classification. The processor 510 can be caused to enable one or more circuits to provide proper loads conforming to the standard or specification used.

In certain examples, the PSE can be set to allocate power that is requested at set power levels based on classifications. The PSE can further be set to allocate power if the PSE has enough unallocated power to provide the allocation. Negotiations between the PSE and the computing device 500 can occur as detailed above. As such, the PSE can remove power during a ramp up period if there is insufficient power to allocate to the computing device 500.

The processor 510 can then determine whether the request for power was successful. This can be based on a circuit controlled by the processor 510 that can tell the processor whether power is being applied via the network connector 512 to power the computing device 500. If no power is applied (e.g., if the PSE removes power after the ramp up period), then the processor 510 can determine that the request for power was unsuccessful. The presentation instructions 526 can be used to cause the processor 510 to drive the display 514 to present information that the request was unsuccessful. As detailed above, other information can also be presented on the display 514.

In certain embodiments, if the first attempt for power negotiation is unsuccessful, another attempt can be made or multiple other attempts can be made. In one example, the power instructions 522 can be executed to determine a second power classification to request via the network connector 512 from the PSE. In one example, the second power classification can be selected based on received input (e.g., a switch). In another example, the power classification can be automatically performed. In the example of an 802.3 compliant device, the first class attempted may be Class 4, the request for the highest amount of power. In this scenario, the class representation can be decremented, for example, to Class 3, Class 2, etc. automatically to allow the computing device 500 to attempt to determine if the PSE has power capacity that can be allocated and/or how much can be allocated.

The identification instructions 524 can then be executed to represent the computing device 500 via the network connector 512 as a device requesting power at a second power level associated with the class selected. This can be caused by enabling one circuit or multiple circuits used to cause particular impedance characteristics to be presented via the network connection. The processor 510 can then determine whether the request for the second power level was successful. An indication can be presented on the display 514 as to whether the request was successful. In certain scenarios, the presentation may also include information indicating the second power level.

What is claimed is:

1. A network powered device comprising:
   a network connector that can provide power and communications to the network powered device;
   a power source that can provide power to the network powered device;
   a power negotiation module to negotiate for the power from a power sourcing equipment connected via the network connector; and
   a failure indicator to indicate, if the negotiation has failed, that the negotiation has failed,
   wherein the negotiation includes providing a first current draw on the connection to the power sourcing equipment indicating a request for a first power level,
   wherein, if the negotiation fails, a memory stores an indicator of the failed negotiation, and
   wherein the power negotiation module is further caused to provide a second current draw on the connection to the power sourcing equipment indicating a request for a second power level based on the indicator.

2. The network powered device of claim 1, wherein the failure indicator is powered by the power source if the negotiation has failed.

3. The network powered device of claim 1, further comprising:
   a success indicator to indicate, if the negotiation is successful, that the negotiation is successful.

4. The network powered device of claim 1,
   wherein the negotiation is associated with a first power level,
   wherein if the negotiation fails, the power negotiation module performs a second negotiation for the power at a second power level that is lower than the first power level.

5. The network powered device of claim 4, further comprising:
   a power level indicator to indicate, if the second negotiation is successful, the power level of the second negotiation.

6. The network powered device of claim 1, further comprising:
   a power selection module to select a power level associated with the negotiation for power.

7. The network powered device of claim 6, wherein the power selection module comprises:
   a controller to control what the network powered device presents itself as by causing circuitry to present a load based on a selected voltage level associated with a corresponding power classification.

8. The network powered device of claim 6, wherein the power selection module comprises:
   a switch to change electrical connections used for negotiation by enabling a resistor of a resistance associated with a corresponding power classification.

9. A method comprising:
   powering a network powered device with an auxiliary power source,
   wherein the network powered device includes a network connector that can provide power and communications when connected to a power sourcing equipment;
   negotiating, at the network powered device, to obtain power at a first power level from the power sourcing equipment including:
      providing a first current draw on the connection to the power sourcing equipment indicating a request for the first power level;
   determining, at the network powered device, that the negotiation to obtain the power level was unsuccessful;
   storing indicator information representative of an indication of unsuccessful negotiation when the negotiation to obtain the first power level was unsuccessful;
   negotiating, at the network powered device, to obtain power at a second power level from the power sourcing equipment including:
      providing, based on the indicator information, a second current draw on the connection to the power sourcing equipment indicating a request for the second power level; and
   indicating, at the network powered device, that the negotiation was unsuccessful via an indicator disposed upon the network powered device.

10. The method of claim 9, further comprising:
    automatically setting up the network powered device for negotiation with the power sourcing equipment to obtain the power at second power level,
    wherein, if the negotiation for the second power level is successful, indicating, at the network powered device, that the second power level was successful.

11. The method of claim 9, further comprising:
    setting the second power level used for the negotiation for the second power level based on user input.

12. The method of claim 11, wherein the negotiation for the second power level is based on a representation made by the network powered device to the power sourcing equipment based on the set power level.

13. The method of claim 9, wherein the determination that the negotiation for the first power level was unsuccessful is based on whether the network powered device receives power via the network connector.

14. The method of claim 9, wherein the indicating that the negotiation was unsuccessful occurs while not receiving power at the first power level from the power sourcing equipment.

15. A non-transitory machine-readable storage medium storing instructions that, if executed by a processor of a network powered device, cause the processor to:
    determine a first power classification to request power via a network connector from a power sourcing equipment,
    wherein the network powered device includes an auxiliary power source;
    cause identification of the network powered device to be presented to the power sourcing equipment via the network connector;
    cause a first current draw on a connection to the power sourcing equipment via the network connector to request power at a first power level associated with the first power classification;
    determine that the request for power was unsuccessful;
    store an indicator that the request for power was unsuccessful;

cause, based on the indicator, a second current draw on the connection to the power sourcing equipment via the network connector to request power at a second power level associated with a second power classification; and cause presentation that the request for power at the first power level was unsuccessful on a display of the network powered device.

16. The non-transitory machine-readable storage medium of claim 15, further comprising instructions that, if executed by the processor, cause the processor to:

determine the second power classification to request via the network connector from the power sourcing equipment;

cause identification of the network powered device to be presented to the power sourcing equipment via the network connector as the network powered device requesting the power at the second power level associated with the second power classification;

determine whether the request for the power at the second power level is successful; and cause presentation of the successfulness of the request for the power at the second power level.

17. The non-transitory machine-readable storage medium of claim 16, wherein the second power classification is determined based on received input.

18. The non-transitory machine-readable storage medium of claim 15, wherein the instructions, when executed, cause the processor to drive the display to present power level information associated with the second power level.

19. The non-transitory machine-readable storage medium of claim 15, wherein:

the instructions to determine that the request for power was unsuccessful, when executed, cause the processor to perform the determination based on removal of power by the power sourcing equipment; and the instructions to cause presentation that the request for power at the first power level was unsuccessful are caused to be executed in response to the removal of power by the power sourcing equipment.

* * * * *